(12) United States Patent
Illan

(10) Patent No.: US 11,649,139 B2
(45) Date of Patent: May 16, 2023

(54) ELECTRONIC SAFETY ACTUATOR ASSEMBLY FOR ELEVATOR SYSTEM

(71) Applicant: Otis Elevator Company, Farmington, CT (US)

(72) Inventor: Juan Antonio Illan, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 931 days.

(21) Appl. No.: 16/531,746

(22) Filed: Aug. 5, 2019

(65) Prior Publication Data
US 2020/0039789 A1 Feb. 6, 2020

(30) Foreign Application Priority Data
Aug. 3, 2018 (EP) ..................................... 18382594

(51) Int. Cl.
*B66B 5/22* (2006.01)
*B66B 1/32* (2006.01)
*F16D 121/20* (2012.01)

(52) U.S. Cl.
CPC .................. *B66B 5/22* (2013.01); *B66B 1/32* (2013.01); *F16D 2121/20* (2013.01)

(58) Field of Classification Search
CPC ..................................... B66B 1/32; B66B 5/22
See application file for complete search history.

(56) References Cited

U.S. PATENT DOCUMENTS

| 5,096,020 A    | 3/1992 | Korhonen |
| 7,575,099 B2 * | 8/2009 | Oh ........................... B66B 5/22 |
|                |        | 187/373 |
| 7,578,373 B2   | 8/2009 | Shiratsuki et al. |

(Continued)

FOREIGN PATENT DOCUMENTS

| CN | 1860077 A   | 11/2006 |
| CN | 101565145 A | 10/2009 |

(Continued)

OTHER PUBLICATIONS

Chinese Office Action for Application No. 201910711529.7; dated Aug. 28, 2020; 6 Pages.

(Continued)

*Primary Examiner* — Diem M Tran
(74) *Attorney, Agent, or Firm* — Cantor Colburn LLP

(57) ABSTRACT

An electronic safety actuator assembly for an elevator system includes a safety case vertically moveable relative to an elevator car. Also included is a safety brake disposed within the safety case. Further included is an electromagnet operatively coupleable to the elevator car. Yet further included is a link member operatively coupleable to the elevator car and to the safety brake. Also included is a magnet disposed between the electromagnet and the safety case, the magnet vertically moveable relative to the elevator car, the electromagnet switchable between an energized condition and an un-energized condition, one of the energized condition and the un-energized condition magnetically attracting the magnet to the electromagnet, the other of the energized condition and the un-energized condition magnetically repulsing the magnet away from the electromagnet, repulsion of the magnet moving the safety brake from a non-braking position to a braking position.

17 Claims, 3 Drawing Sheets

(56) References Cited

U.S. PATENT DOCUMENTS

| | | | |
|---|---|---|---|
| 8,186,483 B2* | 5/2012 | Sirigu | B66B 5/22 |
| | | | 187/373 |
| 9,457,989 B2* | 10/2016 | Meierhans | B66B 5/20 |
| 9,981,827 B2 | 5/2018 | Osmanbasic et al. | |
| 2008/0128218 A1 | 6/2008 | Gremaud et al. | |
| 2018/0162694 A1 | 6/2018 | Hu | |

FOREIGN PATENT DOCUMENTS

| | | |
|---|---|---|
| CN | 205132808 U | 4/2016 |
| CN | 104326325 B | 8/2016 |
| CN | 206266034 U | 6/2017 |
| CN | 105329737 B | 12/2017 |
| CN | 107434196 A | 12/2017 |
| CN | 107434197 A | 12/2017 |
| CN | 107848750 A | 3/2018 |
| EP | 1568643 A1 | 8/2005 |
| GB | 496536 A | 12/1938 |
| JP | 2012140214 A | 7/2012 |
| JP | 4990202 B2 | 8/2012 |
| JP | 5137507 B2 | 2/2013 |
| JP | 5137508 B2 | 2/2013 |
| WO | 2017098299 A1 | 6/2017 |

OTHER PUBLICATIONS

European Search Report for application 18382694.2, dated May 24, 2019, 7 pages.

* cited by examiner

ELECTRONIC SAFETY ACTUATOR ASSEMBLY FOR ELEVATOR SYSTEM

FOREIGN PRIORITY

This application claims priority to European Patent Application No. 18382594.2, filed Aug. 3, 2018, and all the benefits accruing therefrom under 35 U.S.C. § 119, the contents of which in its entirety are herein incorporated by reference.

BACKGROUND

The embodiments herein relate to elevator systems and, more particularly, to an electronic safety actuator and safety assemblies for elevator systems.

Elevator braking systems may include a safety braking system configured to assist in braking a hoisted structure (e.g., elevator car) relative to a guide member, such as a guide rail, in the event the hoisted structure exceeds a predetermined criteria, such as speed or acceleration, for example. Some braking systems include an electronic safety actuation device to actuate one or more safeties.

BRIEF SUMMARY

Disclosed is an electronic safety actuator assembly for an elevator system including a safety case vertically moveable relative to an elevator car. Also included is a safety brake disposed within the safety case. Further included is an electromagnet operatively coupleable to the elevator car. Yet further included is a link member operatively coupleable to the elevator car and to the safety brake. Also included is a magnet disposed between the electromagnet and the safety case, the magnet vertically moveable relative to the elevator car, the electromagnet switchable between an energized condition and an un-energized condition, one of the energized condition and the un-energized condition magnetically attracting the magnet to the electromagnet, the other of the energized condition and the un-energized condition magnetically repulsing the magnet away from the electromagnet, repulsion of the magnet moving the safety brake from a non-braking position to a braking position.

In addition to one or more of the features described above, or as an alternative, further embodiments may include that the brake member is wedge shaped with an inclined surface located adjacent a corresponding inclined surface of a structure of the safety case.

In addition to one or more of the features described above, or as an alternative, further embodiments may include a spring operatively coupleable to the elevator car and in contact with the elevator case to bias the safety case downwardly, a magnetic force between the electromagnet and the magnet when in a magnetically attracted condition being greater than a spring force applied by the spring.

In addition to one or more of the features described above, or as an alternative, further embodiments may include that the magnet is integrally formed with the safety case.

In addition to one or more of the features described above, or as an alternative, further embodiments may include that the magnet is operatively coupled to the safety case.

In addition to one or more of the features described above, or as an alternative, further embodiments may include that the magnet is embedded within the safety case.

In addition to one or more of the features described above, or as an alternative, further embodiments may include that the energized condition of the electromagnet magnetically attracts the magnet and the un-energized condition of the electromagnet magnetically repulses the magnet.

In addition to one or more of the features described above, or as an alternative, further embodiments may include that the un-energized condition of the electromagnet magnetically attracts the magnet and the energized condition of the electromagnet magnetically repulses the magnet.

Also disclosed is an elevator system including an elevator car. Also included is a guide rail. Further included is a safety case vertically moveable relative to the elevator car. Yet further included is a safety brake disposed within the safety case. Also included is an electromagnet operatively coupled to the elevator car. Further included is a link member operatively coupled to the elevator and to the safety brake. Yet further included is a magnet disposed between the electromagnet and the safety case, the magnet vertically moveable relative to the elevator car, the electromagnet switchable between an energized condition and an un-energized condition, one of the energized condition and the un-energized condition magnetically attracting the magnet to the electromagnet, the other of the energized condition and the un-energized condition magnetically repulsing the magnet away from the electromagnet, repulsion of the magnet moving the safety brake into frictional engagement with the guide rail to decelerate the elevator car.

In addition to one or more of the features described above, or as an alternative, further embodiments may include that the brake member is wedge shaped with an inclined surface located adjacent a corresponding inclined surface of a structure of the safety case.

In addition to one or more of the features described above, or as an alternative, further embodiments may include a spring operatively coupleable to the elevator car and in contact with the elevator case to bias the safety case downwardly, a magnetic force between the electromagnet and the magnet when in a magnetically attracted condition being greater than a spring force applied by the spring.

In addition to one or more of the features described above, or as an alternative, further embodiments may include that the magnet is integrally formed with the safety case.

In addition to one or more of the features described above, or as an alternative, further embodiments may include that the magnet is operatively coupled to the safety case.

In addition to one or more of the features described above, or as an alternative, further embodiments may include that the magnet is embedded within the safety case.

In addition to one or more of the features described above, or as an alternative, further embodiments may include that the energized condition of the electromagnet magnetically attracts the magnet and the un-energized condition of the electromagnet magnetically repulses the magnet.

In addition to one or more of the features described above, or as an alternative, further embodiments may include that the un-energized condition of the electromagnet magnetically attracts the magnet and the energized condition of the electromagnet magnetically repulses the magnet.

Further disclosed is an elevator system including an elevator car. Also included is a guide rail. Further included is a safety case not directly coupled to the elevator car and vertically moveable relative to the elevator car, the safety case at least partially formed of a magnetic material. Yet further included is a safety brake disposed within the safety case. Also included is an electromagnet operatively coupleable to the elevator car, the electromagnet switchable between an energized condition and an un-energized condition, one of the energized condition and the un-energized condition magnetically attracting the safety case to the electromagnet, the other of the energized condition and the un-energized condition no longer magnetically attracting the safety case to the electromagnet to move the safety brake into frictional engagement with the guide rail to decelerate the elevator car.

In addition to one or more of the features described above, or as an alternative, further embodiments may include that the brake member is wedge shaped with an inclined surface located adjacent a corresponding inclined surface of a structure of the safety case.

In addition to one or more of the features described above, or as an alternative, further embodiments may include a spring operatively coupleable to the elevator car and in contact with the elevator case to bias the safety case downwardly, a magnetic force between the electromagnet and the safety case when in a magnetically attracted condition being greater than a spring force applied by the spring.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
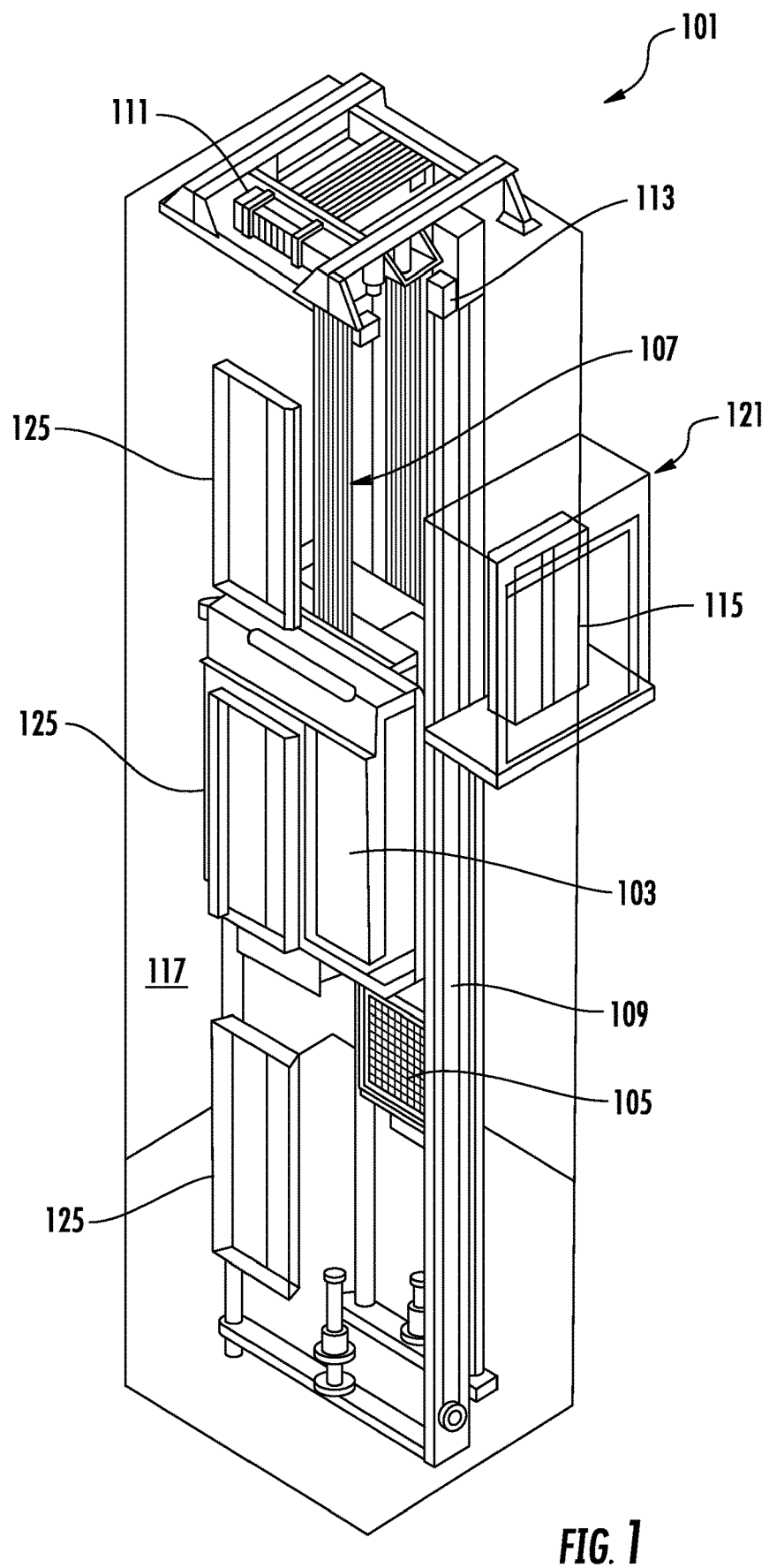
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
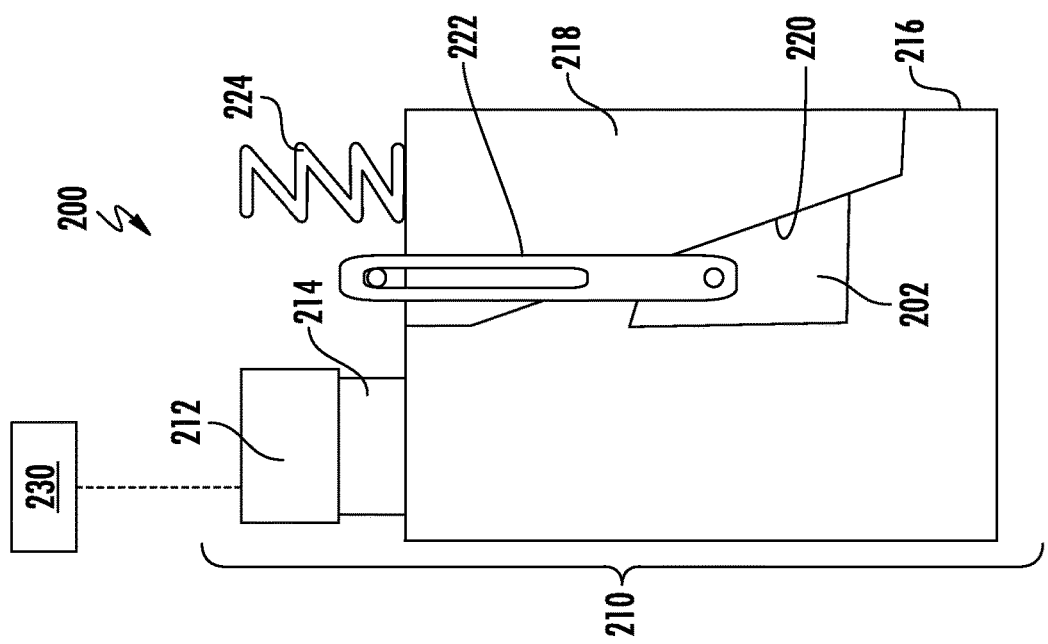
FIG. 2 is an elevational view of an electronic safety actuator assembly in a first operating condition.

Referring now to FIG. 2, the elevator system 101 includes a brake assembly 200 having a safety brake 202 that is suitable for repeatable braking engagement with the guide rail 109 (not shown). As shown, the safety brake 202 is a wedge shaped brake member that is triggered from a non-braking position to a braking position with an electronic safety actuator assembly 210. Although a wedge shaped brake member is illustrated and described herein, it is to be appreciated that the safety brake member 202 may be other braking structures, such as rollers or a double wedge assembly, for example. The safety brake member 202 has a contact surface that is operable to frictionally engage the guide rail 109 when moved to the braking condition. The non-braking position is a position that the safety brake 202 is disposed in during normal operation of the elevator car 103. In particular, the contact surface of the brake member 202 is not in contact with, or is in minimal contact with, the guide rail 109 while in the non-braking position, and thus does not substantially frictionally engage the guide rail 109. In the braking position, the frictional force between the contact surface of the brake member 202 and the guide rail 109 is sufficient to stop movement of the elevator car 103 relative to the guide rail 109.

The electronic safety actuator assembly 210 includes an electromagnet 212 that is operatively coupled to the elevator car 103. In some embodiments, the electromagnet 212 is mounted to a car frame of the elevator car 103. A magnet 214 is in selective contact with the electromagnet 212, but is not fixed relative to the elevator car 103. Depending upon the application of electrical current to the electromagnet 212, the magnet 214 is either attracted to the electromagnet 212 or repulsed away from the electromagnet 212. In one embodiment, the electromagnet 212 may be configured to have current constantly running therethrough to maintain attraction of the magnet 214, with the cessation of current discontinuing the attraction of the magnet 214 to the electromagnet 212. In another embodiment, the electromagnet 212 may have no current running through it to maintain attraction of the magnet 214, with the application of current running therethrough discontinuing the attraction of the magnet 214 to the electromagnet 212.

The electronic safety actuator assembly 210 also includes a safety case 216 that houses components, such as the safety brake 202, as well as a structure 218 having an inclined surface 220 that substantially corresponds to the incline of the wedge shaped safety brake 202. The safety case 216 is free to move vertically, but is constrained from movement front-to-back or side-to-side. The inclined surface 220 allows the safety brake 202 to slide therealong for movement between the non-braking position and the braking position. The safety case 216 is coupled to the elevator car 103 such that relative movement between the safety case 216 and the elevator car 103 is possible, as is the case with the magnet 214.

A link member 222 is coupled to the elevator car 103 proximate a top end of the link member 222 and to the safety brake 202 proximate a lower end of the link member 222. Coupling of the link member 222 to the elevator car 103 fixes the position of the safety brake 202 relative to the elevator car 103.

A spring 224—which may be any type of suitable spring, such as a coil spring, pneumatic spring, hydraulic spring, leaf spring, torsion spring, etc.—that is operatively coupled to the elevator car 103 is in contact with the safety case 216 to bias the safety case 216 downwardly. However, the magnet 214 is coupled to the safety case 216, and such coupling leads to an upward magnetic attractive force on the safety case 216 that is greater than the spring force that is biasing the safety case 216 downwardly when the magnet 214 and the electromagnet 212 are in the magnetically attracted condition. In some embodiments, the magnet 214 is integrally formed with the safety case 216. In other embodiments, all or a relevant portion of the safety case 216 is formed of a magnetic material that is able to be selectively attracted to, or repulsed by, the electromagnet 212. In other embodiments, the magnet 214 is a separate component that is coupled to the safety case 216. In some embodiments, the spring 224 may not be needed, as magnetic attraction/repulsion is sufficient to achieve the desired movements.

In operation, an electronic sensing device and/or a controller 230 is configured to monitor various parameters and conditions of the elevator car 103 and to compare the monitored parameters and conditions to at least one predetermined condition. In one embodiment, the predetermined condition comprises speed and/or acceleration of the elevator car 103. The controller 230 is in operative communication with the electromagnet 212, either directly or indirectly.

In the event that the monitored condition (e.g., speed, acceleration, etc.) meets or exceeds the predetermined condition, the state (e.g., energized or de-energized) of the electromagnet 212 is switched to actuate the safety brake 202 to be in frictional engagement with the guide rail 109, as described herein.

Figure 3:
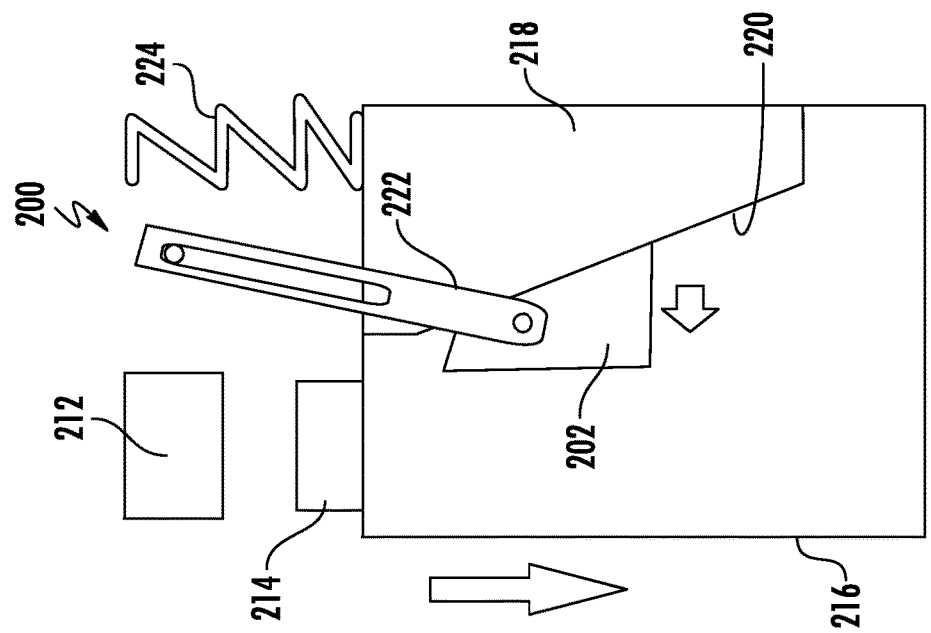
FIG. 3 is an elevational view of the electronic safety actuator assembly in a second operating condition.

Referring now to FIG. 3, upon actuation the electromagnet 212 repulses the magnet 214, thereby removing the upward magnetic force applied to the safety case 216. This allows the force of the spring 224 to push the safety case 216 downwardly. The repulsive force between the electromagnet 212 and the magnet 214 may also assist with downward movement of the safety case 216. As noted above, it is contemplated that the spring 224 is not necessary to achieve the desired movement, as the magnetic attraction/repulsion may be sufficient. During downward movement of the safety case 216, the vertical position of the safety brake 202, relative to the elevator car 103, is maintained due to the coupling of the safety brake 202 to the link member 222, which is coupled to the elevator car 103, as described above. The configuration moves the safety brake 202 upwardly, relative to the safety case 216. This biases the safety brake 202 horizontally against the guide rail 109 due to the inclined surface 220 of the safety case structure 218 which the safety brake 202 rides along. This position of the safety brake 202 is referred to as a transition to the braking position.

Figure 4:
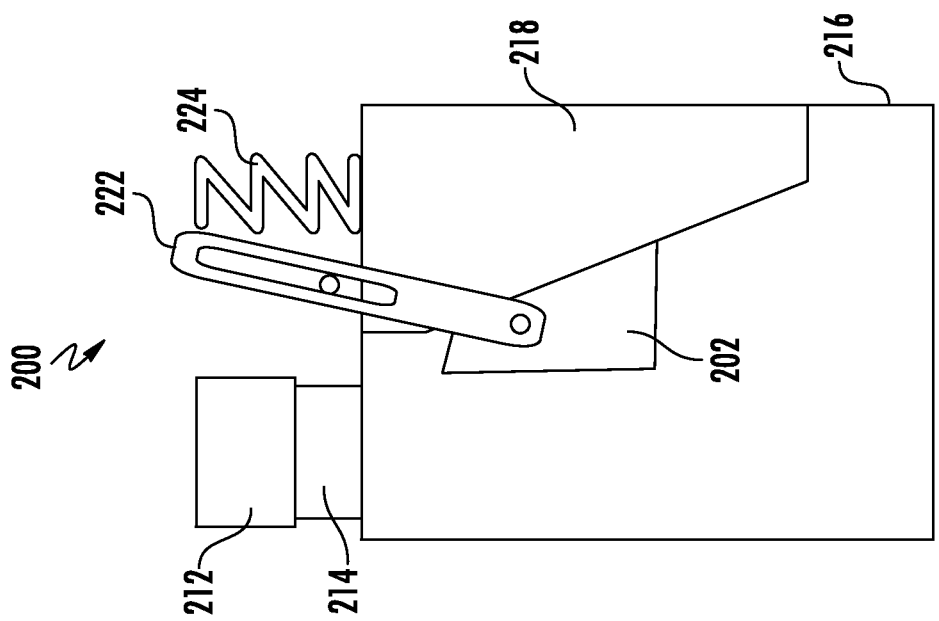
FIG. 4 is an elevational view of the electronic safety actuator assembly in a third operating condition.

Referring now to FIG. 4, engagement of the safety brake 202 with the guide rail 109 causes a frictional force that is sufficient to move the safety brake 202 and the safety case 216 upwardly. This position is referred to as the braking position, as it forces the elevator car 103 to decelerate and ultimately stop. As shown, the upward movement of the safety case 216 causes the magnet 214 to move up and be in contact with the electromagnet 212. Deceleration of the elevator is achieved once the safety case 216 comes in contact with the elevator car (or upright). When moving upwards, the link member 222 does not prevent the safety brake 202 from moving relative to the elevator car (or upright).

Figure 5:
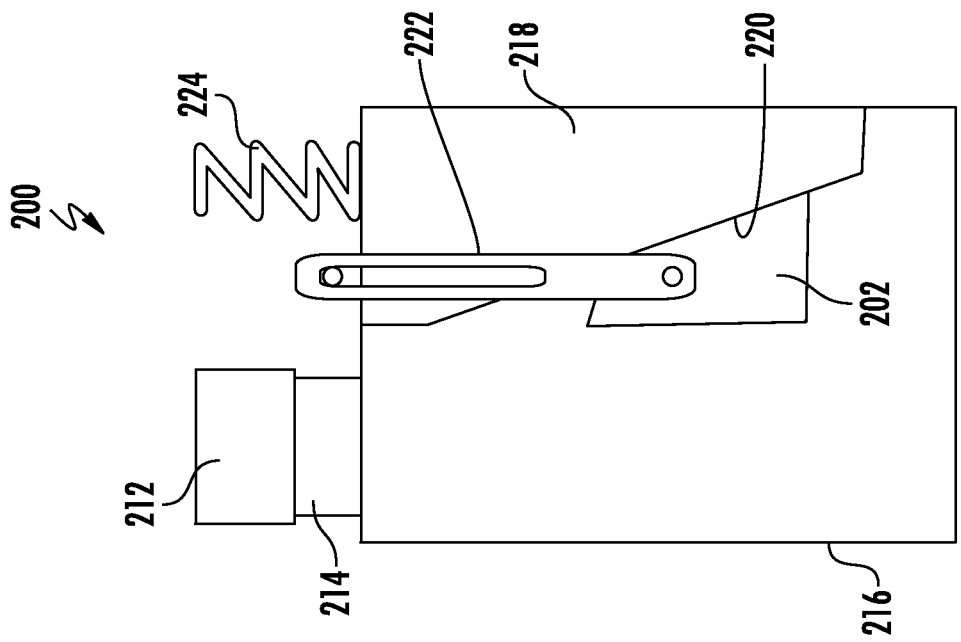
FIG. 5 is an elevational view of the electronic safety actuator assembly in a fourth operating condition.

Referring now to FIG. 5, disengagement of the safety brake 202 from the guide rail 109 is illustrated. In this condition, the electromagnet 212 has current applied (or cut off) to provide the magnetic attractive force between the electromagnet 212 and the magnet 214. This force is sufficient to hold the weight of the safety case 216 so only the safety brake 202 moves downwardly as the elevator car 103 is moved up. The magnetic force is also sufficient to be greater than the spring force of the spring 224, and to hold against the disengaging force. As these conditions are met, upward movement of the elevator car 103 results in only the safety brake 202 moving down for proper disengagement from the guide rail 109, thereby resetting the original position of the components of the electronic safety actuator assembly 200.

The embodiments described herein provide a safety case that is not directly coupled to the elevator car, and is not fixed relative to the elevator car in vertical position, avoiding the need for a mechanical linkage between safeties of the overall braking system. Additionally the embodiments represent a cost reduction with respect to prior systems and avoids noise risks associated to prior systems.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electronic safety actuator assembly for an elevator system comprising:
   a safety case vertically moveable relative to an elevator car;
   a safety brake disposed within the safety case;
   an electromagnet operatively coupleable to the elevator car;
   a link member operatively coupleable to the elevator car and to the safety brake; and
   a magnet disposed between the electromagnet and the safety case, the magnet vertically moveable relative to the elevator car, the electromagnet switchable between an energized condition and an un-energized condition, one of the energized condition and the un-energized condition magnetically attracting the magnet to the electromagnet, the other of the energized condition and the un-energized condition magnetically repulsing the magnet away from the electromagnet, repulsion of the magnet moving the safety brake from a non-braking position to a braking position.

2. The electronic safety actuator assembly of claim 1, wherein the brake member is wedge shaped with an inclined surface located adjacent a corresponding inclined surface of a structure of the safety case.

3. The electronic safety actuator assembly of claim 1, further comprising a spring operatively coupleable to the elevator car and in contact with the elevator case to bias the safety case downwardly along the direction of gravity, a magnetic force between the electromagnet and the magnet when in a magnetically attracted condition being greater than a spring force applied by the spring.

4. The electronic safety actuator assembly of claim 1, wherein the magnet is integrally formed with the safety case.

5. The electronic safety actuator assembly of claim 1, wherein the magnet is operatively coupled to the safety case.

6. The electronic safety actuator assembly of claim 1, wherein the magnet is embedded within the safety case.

7. The electronic safety actuator assembly of claim 1, wherein the energized condition of the electromagnet magnetically attracts the magnet and the un-energized condition of the electromagnet magnetically repulses the magnet.

8. The electronic safety actuator assembly of claim 1, wherein the un-energized condition of the electromagnet magnetically attracts the magnet and the energized condition of the electromagnet magnetically repulses the magnet.

9. The electronic safety actuator assembly of claim 1, wherein repulsing the magnet away from the electromagnet includes the magnet moving the safety brake downwardly along a direction of gravity from the non-braking position to the braking position.

10. An elevator system comprising:
    an elevator car;
    a guide rail;
    a safety case vertically moveable relative to the elevator car;
    a safety brake disposed within the safety case;
    an electromagnet operatively coupled to the elevator car;
    a link member operatively coupled to the elevator and to the safety brake; and
    a magnet disposed between the electromagnet and the safety case, the magnet vertically moveable relative to the elevator car, the electromagnet switchable between an energized condition and an un-energized condition, one of the energized condition and the un-energized condition magnetically attracting the magnet to the electromagnet, the other of the energized condition and the un-energized condition magnetically repulsing the magnet away from the electromagnet, repulsion of the magnet moving the safety brake into frictional engagement with the guide rail to decelerate the elevator car.

11. The elevator system of claim 10, wherein the brake member is wedge shaped with an inclined surface located adjacent a corresponding inclined surface of a structure of the safety case.

12. The elevator system of claim 10, further comprising a spring operatively coupleable to the elevator car and in contact with the elevator case to bias the safety case downwardly, a magnetic force between the electromagnet and the magnet when in a magnetically attracted condition being greater than a spring force applied by the spring.

13. The elevator system of claim 10, wherein the magnet is integrally formed with the safety case.

14. The elevator system of claim 10, wherein the magnet is operatively coupled to the safety case.

15. The elevator system of claim 10, wherein the magnet is embedded within the safety case.

16. The elevator system of claim 10, wherein the energized condition of the electromagnet magnetically attracts the magnet and the un-energized condition of the electromagnet magnetically repulses the magnet.

17. The elevator system of claim 10, wherein the un-energized condition of the electromagnet magnetically attracts the magnet and the energized condition of the electromagnet magnetically repulses the magnet.

* * * * *